US008494682B2

(12) United States Patent
Elmer et al.

(10) Patent No.: US 8,494,682 B2
(45) Date of Patent: Jul. 23, 2013

(54) METHOD OF AND SYSTEM FOR IMPROVING SPRINKLER SYSTEM EFFICIENCY

(75) Inventors: Clarence Edgar Elmer, Fairview, TX (US); Janon Lee Elmer, Fairview, TX (US)

(73) Assignee: Janon, Inc., Plano, TX (US)

(*) Notice: Subject to any disclaimer, the term of this patent is extended or adjusted under 35 U.S.C. 154(b) by 329 days.

(21) Appl. No.: 11/977,811

(22) Filed: Oct. 26, 2007

(65) Prior Publication Data

US 2008/0111001 A1    May 15, 2008

Related U.S. Application Data

(60) Provisional application No. 60/864,054, filed on Nov. 2, 2006.

(51) Int. Cl.
*A01G 25/16* (2006.01)
*B05B 1/30* (2006.01)
*B05B 12/02* (2006.01)

(52) U.S. Cl.
USPC ............... 700/284; 239/11; 239/69; 239/569

(58) Field of Classification Search
USPC .................. 700/282–284; 239/11, 63, 67–70, 239/569; 137/1, 2, 78.1, 78.2; 702/45, 47, 702/50
See application file for complete search history.

(56) References Cited

U.S. PATENT DOCUMENTS

| 4,209,131 A | 6/1980 | Barash et al. |
| 4,265,403 A | 5/1981 | Bonetti |
| 4,303,203 A * | 12/1981 | Avery ........................... 239/728 |
| 5,048,755 A * | 9/1991 | Dodds ............................ 239/69 |
| 5,348,227 A | 9/1994 | Polonsky |
| 5,803,363 A | 9/1998 | Matsumura |
| 5,878,953 A * | 3/1999 | Coffman ......................... 239/69 |
| 5,927,603 A | 7/1999 | McNabb |
| 6,036,121 A * | 3/2000 | Gerdes ............................ 239/11 |
| 6,234,403 B1 | 5/2001 | Grott |
| 6,267,298 B1 * | 7/2001 | Campbell ....................... 239/70 |
| 6,568,416 B2 | 5/2003 | Tucker et al. |
| 6,666,384 B2 * | 12/2003 | Prandi ............................. 239/69 |
| 6,860,288 B2 | 3/2005 | Uhler |
| 7,058,478 B2 | 6/2006 | Alexanian |
| 7,789,321 B2 * | 9/2010 | Hitt ................................. 239/63 |
| 2005/0279856 A1 * | 12/2005 | Nalbandian et al. ............ 239/76 |
| 2006/0091245 A1 * | 5/2006 | Ivans ............................... 239/69 |
| 2006/0155489 A1 | 7/2006 | Addink |
| 2006/0202051 A1 * | 9/2006 | Parsons et al. .................. 239/69 |

FOREIGN PATENT DOCUMENTS

| EP | 0 004 371 | 10/1979 |
| WO | WO-2005/002321 | 1/2005 |

OTHER PUBLICATIONS

Sidhpuria M. S. et al., "Effects of Sprinkler Spacing, Nozzle Pressure and Riser Height on Performance of Sprinkler Irrigation System", Institution of Engineers, India, 1994, pp. 36-40.

Kang, Yaohu et al., "Design of Microirrigation Submain Units", Journal of Irrigation and Drainage Engineering, Mar./Apr. 1996, pp. 83-89.

Arizona Water Resource; "Global Water Shortage Looms In New Century", vol. 8, No. 3, Nov.- Dec. 1999 (3 pages).

Lee W. Young, PCT International Search Report For PCT/US07/22805, Apr. 23, 2008, (2 pages).

* cited by examiner

*Primary Examiner* — Charles Kasenge
(74) *Attorney, Agent, or Firm* — Winstead PC

(57) ABSTRACT

A method of increasing the efficiency of an irrigation system includes measuring an inline pressure of an irrigation system via an inline pressure gauge. The method also includes adjusting the inline pressure of the irrigation system to a value closer to a predefined optimal design pressure of a water outlet of the irrigation system and calculating a desired run time using at least the predefined optimal design pressure.

19 Claims, 4 Drawing Sheets

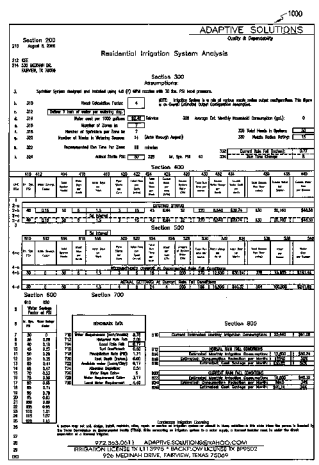

ADAPTIVE SOLUTIONS
*Quality & Dependability*

Section 200
210 August 6, 2006

Residential Irrigation System Analysis

212 CEE
214 530 MEDINAH DR.
FAIRVIEW, TX 78099

Section 300
Assumptions:

| | | | | | | |
|---|---|---|---|---|---|---|
| a. | | Sprinkler System designed and installed using 4.0 (F) GPM nozzles with 30 lbs. PSI head pressure. | | | | |
| b. | 310 | Head Calculation Factor: | 4 | NOTE: Irrigation System is a mix of various nozzle radius output configurations. This figure is an Overall Estimated Output Configuration Assumption. | | |
| c. | 312 | Deliver 1 inch of water per watering day. | | | | |
| d. | 314 | Water cost per 1000 gallons: | $2.40 Fairview | 326 Average Est. Monthly Household Consumption (gal.): | 0 | |
| e. | 316 | Number of Zones is: | 7 | | | |
| f. | 318 | Number of Sprinklers per Zone is: | 7 | 328 Total Heads in System: | 50 | |
| g. | 320 | Number of Weeks in Watering Season: | 14 (June through August) | 330 Nozzle Radius Rating: | 15 | |
| h. | 322 | Recommended Run Time Per Zone: | 18 minutes | 332 Current Rain Fall (inches): | 0.77 | |
| i. | 324 | Actual Static PSI: 50 325 Irr. Sys. PSI 40 | | 334 Run Time Change: | 8 | |

Section 400

| | 410 | 412 | 414 | 416 | 418 | 420 | 422 | 424 | 426 | 428 | 430 | 432 | 434 | 436 | 438 | 440 |
|---|---|---|---|---|---|---|---|---|---|---|---|---|---|---|---|---|
| LINE ITEM | Irr. Sys. PSI | Water Savings Factor | Total System Heads | Water Days per Month | Water Days per Week | Pgm Starts per Cycle | Total Time per Cycle (mins) | Total Run Time per Week | Excess Water per Head (GPM) | Excess System Water GPM | Total Run Time per Month | Excess Water Usage per Month | Excess Water Cost per Month | Total Season Run Time (mins) | Excess Water per Season | Excess Water Cost per Season |
| 1 | | | | | | | | | | | | | | | | |
| 2-a | | | | | | EXISTING STATUS | | | | | | | | | | |
| 2-b | 40 | 0.16 | 50 | 6 | 1.5 | 3 | 15 | 45 | 0.64 | 32 | 270 | 8,640 | $20.74 | 630 | 20,160 | $48.38 |
| 2-c | | | | | 5d Interval | | | | | | | | | | | |
| 2-d | 40 | 0.16 | 50 | 6 | 1.5 | 3 | 15 | 45 | 0.64 | 32 | 270 | 8,640 | $20.74 | 630 | 20,160 | $48.38 |
| 3 | | | | | | | | | | | | | | | | |

Section 500

| | 510 | 512 | 514 | 516 | 518 | 520 | 522 | 524 | 526 | 528 | 530 | 532 | 534 | 536 | 538 | 540 |
|---|---|---|---|---|---|---|---|---|---|---|---|---|---|---|---|---|
| | Irr. Sys. PSI | Water Savings Factor | Total System Heads | Water Days per Month | Water Days per Week | Pgm Starts per Cycle | Total Time per Cycle (mins) | Total Run Time per Week | Water per Head GPM | Amount of System Water GPM | Total Run Time per Month | Water Usage per Month | Water Cost per Month | Total Season Run Time (mins) | Water per Season | Water Cost per Season |
| 4-c | | | | | 5d Interval | | | | | | | | | | | |
| 4-a | | | | | RECOMMENDED CHANGE At Documented Rain Fall Conditions | | | | | | | | | | | |
| 4-b | 30 | 0 | 50 | 6 | 1.5 | 3 | 6 | 18 | 4 | 200 | 270 | 12,600 | $30.24 | 378 | 75,600 | $181.44 |
| | | | | | ACTUAL SETTINGS: At Current Rain Fall Conditions | | | | | | | | | | | |
| 4-d | 30 | 0 | 50 | 6 | 1.5 | 4 | 6 | 24 | 4 | 200 | 108 | 16,800 | $40.32 | 504 | 100,800 | $241.92 |

Section 600
610 620

5 Water Savings Factor at PSI

| Line | Irr. Sys. PSI | Water Savings Factor |
|---|---|---|
| 6 | | |
| 7 | 30 | 0 |
| 8 | 35 | 0.08 |
| 9 | 40 | 0.16 |
| 10 | 45 | 0.23 |
| 11 | 50 | 0.29 |
| 12 | 55 | 0.35 |
| 13 | 60 | 0.41 |
| 14 | 65 | 0.47 |
| 15 | 70 | 0.53 |
| 16 | 75 | 0.59 |
| 17 | 80 | 0.65 |
| 18 | 85 | 0.71 |
| 19 | 90 | 0.79 |
| 20 | 95 | 0.83 |
| 21 | 100 | 0.89 |
| 22 | 105 | 0.95 |
| 23 | 110 | 1.01 |
| 24 | 115 | 1.07 |
| 25 | 120 | 1.13 |

Section 700

BENCHMARK DATA

| | | |
|---|---|---|
| 710 | Water Requirement [inch/month] | 8.76 |
| 712 | Historical Rain Fall: | 2.09 |
| 714 | Local Rain Fall: | 0.77 |
| 716 | Turf Coefficient: | 0.60 |
| 718 | Precipitation Rate (PR): | 1.71 |
| 720 | Root Depth [inches]: | 6.00 |
| 722 | Available water [Loam/Clay]: | 0.17 |
| 724 | Allowable Depletion: | 0.51 |
| 726 | Water Days Calc= | 6 |
| 728 | Water Requirement Calc= | 3.17 |
| 730 | Local Water Requirement | 4.49 |

Section 800

| | | | |
|---|---|---|---|
| 810 | Current Estimated Monthly Irrigation Consumption: | 25,440 | $61.06 |
| 812 | NORMAL RAIN FALL CONDITIONS | | |
| 814 | Estimated Monthly Irrigation Consumption: | 12,600 | $30.24 |
| 816 | Estimated; Consumption Reduction per Month: | 12840 | 50% |
| 818 | Estimated; Cost Savings per Month: | $30.82 | 50% |
| 820 | CURRENT RAIN FALL CONDITIONS | | |
| 822 | Estimated Monthly Irrigation Consumption: | 16,800 | $40.32 |
| 824 | Estimated; Consumption Reduction per Month: | 8640 | 34% |
| 826 | Estimated; Cost Savings per Month: | $20.74 | 34% |

Landscape Irrigation Licensing

A person may not sell, design, install, maintain, alter, repair, or service an irrigation system—or consult in these activities—in this state unless the person is licensed by the Texas Commission on Environmental Quality (TECQ). While connecting an irrigation system to a water supply, a licensed installer must be under the direct supervision of a licensed irrigator.

972.363.0611    ADAPTIVE.SOLUTIONS@YAHOO.COM
IRRIGATION LICENSE TX L113995 * BACKFLOW LICENSE TX BP9502
926 MEDINAH DRIVE, FAIRVIEW, TEXAS 75069

*FIG. 1*

Average Historic Rainfall*
(inches per month)

| City | Jan | Feb | Mar | Apr | May | June | July | Aug | Sept | Oct | Nov | Dec | Total | Weekly Avg | Summer Weekly Avg** |
|---|---|---|---|---|---|---|---|---|---|---|---|---|---|---|---|
| Abilene | 0.87 | 0.90 | 1.00 | 2.20 | 3.25 | 2.50 | 2.25 | 2.25 | 3.50 | 2.25 | 1.23 | 0.85 | 23.07 | 0.44 | 0.53 |
| Amarillo | 0.50 | 0.59 | 0.83 | 1.08 | 2.87 | 3.52 | 2.94 | 3.09 | 1.81 | 1.37 | 0.59 | 0.47 | 19.56 | 0.38 | 0.72 |
| Austin | 1.75 | 2.50 | 1.75 | 3.25 | 4.25 | 3.25 | 2.00 | 2.25 | 4.00 | 3.25 | 2.25 | 2.25 | 32.75 | 0.63 | 0.57 |
| Brownsville | 1.25 | 1.50 | 0.50 | 1.75 | 2.50 | 2.75 | 3.75 | 2.75 | 5.25 | 3.50 | 1.25 | 1.25 | 26.00 | 0.50 | 0.55 |
| College Station | 2.91 | 3.06 | 2.81 | 3.97 | 4.60 | 3.40 | 2.44 | 2.27 | 3.40 | 3.46 | 3.18 | 3.41 | 38.91 | 0.75 | 0.52 |
| Corpus Christi | 1.55 | 1.58 | 0.91 | 2.07 | 2.88 | 3.15 | 2.00 | 3.37 | 6.07 | 3.13 | 1.13 | 1.13 | 29.57 | 0.57 | 0.65 |
| Dallas/Ft. Worth | 2.03 | 2.26 | 2.77 | 4.50 | 4.61 | 3.07 | 2.09 | 2.16 | 3.36 | 3.47 | 2.31 | 2.31 | 34.94 | 0.67 | 0.56 |
| Del Rio | 0.75 | 1.00 | 0.85 | 1.75 | 2.75 | 2.50 | 1.75 | 2.25 | 5.00 | 2.50 | 1.25 | 1.25 | 21.60 | 0.42 | 0.50 |
| El Paso | 0.40 | 0.42 | 0.30 | 0.17 | 0.24 | 0.59 | 1.69 | 1.13 | 1.40 | 0.76 | 0.30 | 0.30 | 7.70 | 0.15 | 0.26 |
| Galveston | 3.75 | 3.00 | 2.15 | 3.25 | 4.00 | 4.00 | 4.00 | 3.50 | 6.00 | 3.25 | 3.25 | 3.75 | 44.90 | 0.86 | 0.95 |
| Houston | 3.75 | 3.25 | 2.75 | 3.50 | 4.25 | 5.00 | 4.75 | 3.75 | 5.25 | 3.75 | 3.75 | 3.75 | 47.50 | 0.91 | 1.03 |
| Lubbock | 0.50 | 0.56 | 0.87 | 1.22 | 2.73 | 2.56 | 2.17 | 2.05 | 2.53 | 2.03 | 0.61 | 0.61 | 18.44 | 0.35 | 0.52 |
| Midland | 0.50 | 0.65 | 0.50 | 0.75 | 2.00 | 1.50 | 2.00 | 1.75 | 2.50 | 1.50 | 0.60 | 0.50 | 14.75 | 0.28 | 0.40 |
| Port Arthur | 4.25 | 3.50 | 2.75 | 4.25 | 4.00 | 5.25 | 5.00 | 6.00 | 3.50 | 4.00 | 4.00 | 4.00 | 50.50 | 0.97 | 1.24 |
| San Angelo | 0.73 | 0.79 | 0.74 | 1.86 | 2.56 | 1.83 | 1.25 | 1.70 | 2.74 | 2.07 | 0.57 | 0.54 | 17.68 | 0.34 | 0.38 |
| San Antonio | 1.75 | 2.10 | 1.75 | 3.00 | 3.75 | 2.75 | 1.75 | 2.75 | 4.00 | 3.00 | 2.25 | 1.50 | 30.35 | 0.66 | 0.55 |
| Victoria | 2.25 | 2.50 | 1.50 | 2.75 | 4.20 | 3.75 | 2.50 | 3.25 | 6.00 | 3.75 | 2.50 | 2.25 | 37.20 | 0.72 | 0.73 |
| Waco | 1.75 | 2.25 | 2.00 | 3.75 | 4.75 | 3.00 | 2.25 | 2.00 | 3.50 | 3.50 | 2.50 | 2.00 | 33.25 | 0.64 | 0.55 |
| Wichita Falls | 1.04 | 1.28 | 1.71 | 2.78 | 4.69 | 5.05 | 2.19 | 2.16 | 3.02 | 2.63 | 1.56 | 1.44 | 27.45 | 0.53 | 0.56 |

*Most of the rainfall figures supplied by Texas Agricultural Extension Service, Texas A&M University System
**Weekly average of peak watering season—June, July and August

*FIG. 2*

Turf Crop Factors

| Type | Month | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bentgrass | 0.61 | 0.64 | 0.75 | 1.04 | 0.95 | 0.88 | 0.94 | 0.86 | 0.74 | 0.75 | 0.69 | 0.60 |
| Bermuda | 0.55 | 0.54 | 0.76 | 0.72 | 0.79 | 0.68 | 0.71 | 0.71 | 0.62 | 0.54 | 0.58 | 0.55 |
| Bluegrass | 0.61 | 0.64 | 0.75 | 1.04 | 0.95 | 0.88 | 0.94 | 0.86 | 0.74 | 0.75 | 0.69 | 0.60 |
| Kikuyu | 0.55 | 0.54 | 0.76 | 0.72 | 0.79 | 0.68 | 0.71 | 0.71 | 0.62 | 0.54 | 0.58 | 0.55 |
| Paspalum | 0.55 | 0.54 | 0.76 | 0.72 | 0.79 | 0.68 | 0.71 | 0.71 | 0.62 | 0.54 | 0.58 | 0.55 |
| Ryegrass | 0.61 | 0.64 | 0.75 | 1.04 | 0.95 | 0.88 | 0.94 | 0.86 | 0.74 | 0.75 | 0.69 | 0.60 |
| St. Augustine | 0.55 | 0.54 | 0.76 | 0.72 | 0.79 | 0.68 | 0.71 | 0.71 | 0.62 | 0.54 | 0.58 | 0.55 |
| Tall Fescue | 0.61 | 0.64 | 0.75 | 1.04 | 0.95 | 0.88 | 0.94 | 0.86 | 0.74 | 0.75 | 0.69 | 0.60 |
| Zoysia | 0.55 | 0.54 | 0.76 | 0.72 | 0.79 | 0.68 | 0.71 | 0.71 | 0.62 | 0.54 | 0.58 | 0.55 |

*FIG. 3*

Average Historic PET (Potential Evapotranspiration)*
(inches per month)

| City | Jan | Feb | Mar | Apr | May | June | July | Aug | Sept | Oct | Nov | Dec | Total | Daily Avg | Weekly Avg | Summer Daily Avg** |
|---|---|---|---|---|---|---|---|---|---|---|---|---|---|---|---|---|
| Abilene | 1.20 | 1.60 | 3.90 | 4.70 | 7.90 | 8.81 | 8.75 | 8.15 | 7.10 | 4.90 | 2.80 | 1.00 | 60.61 | 0.17 | 1.17 | 0.28 |
| Amarillo | 1.20 | 1.50 | 3.80 | 5.00 | 8.86 | 9.72 | 9.61 | 8.95 | 6.80 | 4.70 | 2.60 | 1.20 | 63.98 | 0.18 | 1.23 | 0.31 |
| Austin | 2.00 | 2.68 | 4.30 | 5.27 | 7.55 | 8.28 | 8.12 | 8.20 | 6.22 | 4.93 | 3.08 | 2.08 | 62.69 | 0.17 | 1.21 | 0.27 |
| Brownsville | 2.57 | 3.18 | 4.53 | 5.31 | 6.88 | 7.31 | 7.59 | 7.33 | 5.98 | 5.16 | 3.40 | 2.42 | 61.66 | 0.17 | 1.19 | 0.24 |
| College Station | 2.00 | 2.65 | 4.23 | 5.22 | 7.57 | 8.35 | 8.20 | 8.41 | 6.25 | 4.91 | 2.83 | 2.04 | 62.66 | 0.17 | 1.21 | 0.27 |
| Corpus Christi | 2.42 | 3.06 | 4.56 | 5.31 | 8.97 | 7.53 | 7.89 | 7.45 | 5.95 | 5.12 | 3.28 | 2.30 | 61.64 | 0.17 | 1.19 | 0.25 |
| Dallas/Ft. Worth | 1.50 | 2.45 | 4.09 | 5.15 | 7.41 | 8.42 | 8.76 | 8.13 | 6.13 | 4.49 | 2.62 | 1.72 | 61.17 | 0.17 | 1.18 | 0.28 |
| Del Rio | 1.30 | 1.80 | 4.30 | 5.20 | 8.01 | 8.71 | 8.26 | 8.24 | 7.70 | 6.00 | 3.00 | 1.10 | 63.62 | 0.17 | 1.22 | 0.27 |
| El Paso | 1.30 | 1.70 | 4.20 | 5.60 | 8.88 | 9.91 | 9.24 | 8.32 | 7.60 | 5.20 | 3.00 | 1.10 | 66.05 | 0.18 | 1.27 | 0.30 |
| Galveston | 1.65 | 2.10 | 3.14 | 4.04 | 4.84 | 5.18 | 4.97 | 5.10 | 5.05 | 3.99 | 2.51 | 1.71 | 44.26 | 0.12 | 0.85 | 0.17 |
| Houston | 2.02 | 2.71 | 4.03 | 5.23 | 7.48 | 8.08 | 7.79 | 7.78 | 6.06 | 4.90 | 3.06 | 2.12 | 61.26 | 0.17 | 1.18 | 0.26 |
| Lubbock | 1.20 | 2.10 | 4.60 | 5.40 | 8.37 | 9.23 | 9.06 | 8.26 | 6.80 | 5.00 | 2.30 | 1.00 | 63.12 | 0.17 | 1.21 | 0.29 |
| Midland | 1.30 | 1.70 | 4.20 | 5.80 | 8.60 | 9.23 | 9.10 | 8.35 | 7.80 | 5.20 | 3.00 | 1.10 | 64.98 | 0.18 | 1.26 | 0.29 |
| Port Arthur | 1.98 | 2.71 | 4.09 | 4.93 | 7.09 | 7.66 | 7.25 | 7.27 | 5.82 | 4.74 | 2.95 | 2.00 | 58.49 | 0.16 | 1.12 | 0.24 |
| San Angelo | 1.30 | 1.80 | 4.30 | 5.20 | 8.01 | 8.71 | 8.26 | 8.24 | 7.70 | 6.00 | 3.00 | 1.10 | 63.62 | 0.17 | 1.22 | 0.27 |
| San Antonio | 2.07 | 2.77 | 4.40 | 5.33 | 7.58 | 8.21 | 7.96 | 8.03 | 6.19 | 4.95 | 3.14 | 2.15 | 62.76 | 0.17 | 1.21 | 0.26 |
| Victoria | 2.13 | 2.78 | 4.34 | 5.18 | 7.13 | 7.65 | 7.94 | 7.59 | 6.09 | 5.02 | 3.19 | 2.23 | 61.27 | 0.17 | 1.18 | 0.25 |
| Waco | 1.92 | 2.57 | 4.27 | 5.26 | 7.55 | 8.38 | 8.74 | 8.27 | 6.30 | 4.94 | 2.74 | 1.79 | 62.73 | 0.17 | 1.21 | 0.28 |
| Wichita Falls | 1.10 | 1.50 | 3.70 | 4.50 | 7.89 | 8.86 | 9.20 | 8.50 | 6.70 | 5.20 | 2.10 | 0.90 | 60.15 | 0.16 | 1.16 | 0.29 |

*Most of the rainfall figures supplied by Texas Agricultural Extension Service, Texas A&M University System
**Weekly average of peak watering season—June, July and August

Water Savings Multiplier

| Pressure (PSI) | Water Savings Multiplier |
|---|---|
| 30 | 0.00 |
| 35 | 0.06 |
| 40 | 0.16 |
| 45 | 0.23 |
| 50 | 0.29 |
| 55 | 0.35 |
| 60 | 0.41 |
| 65 | 0.47 |
| 70 | 0.53 |

FIG. 5

| Soil Class | Available Water in./in |
|---|---|
| Sand | 0.08 |
| Sandy Loam | 0.15 |
| Loam | 0.21 |
| Clay Loam | 0.17 |
| Clay | 0.12 |

FIG. 6

ADAPTIVE SOLUTIONS
*Quality & Dependability*

IRRIGATION SYSTEM ANALYSIS CHECKLIST

DATE: August 6, 2006
NAME: CEE
ADDRESS: 930 MEDINAH DR.
CITY: FAIRVIEW
STATE / ZIP: TX  75069   Country: USA
PHONE: 972-555-1212
EMAIL ADDRESS: 55555@22.com Monthly Household Consumption (Gallons): 326
Water Cost per 1000 Gallons: 314
PSI @ HOUSE: 324
Irrigation System PSI (last zone/last head): 325
Number of Programs per Run Time: 420
Total Heads In System: 328
Number of wired zones on Controller: 316

NOZZLE INFO:   Monthly House Usage: Avg.

| Mnfgr: | RB | Jan | 4000 | |
|---|---|---|---|---|
| | | Feb | 4200 | 326 |
| Radius Rating: | 330 | Mar | 3600 | |
| | | Apr | 4000 | |

COMMENTS
3. Two additional popup heads required for coverage issues in Zone 3.

NUMBER OF HEADS PER ZONE:

| | HEADS | macs | | HEADS | macs |
|---|---|---|---|---|---|
| Zone 1: | 7 | 2 | Zone 8: | | |
| Zone 2: | 6 | 2 | Zone 9: | | |
| Zone 3: | 7 | 2 | Zone 10: | | |
| Zone 4: | 7 | 2 | Zone 11: | | |
| Zone 5: | 7 | 2 | Zone 12: | | |
| Zone 6: | 7 | 3 | Zone 13: | | |
| Zone 7: | 7 | 2 | Zone 14: | | |

972.363.0611   ADAPTIVE.SOLUTIONS@YAHOO.COM
IRRIGATION LICENSE TX L1113995 * BACKFLOW LICENSE TX BP9502
926 MEDINAH DRIVE, FAIRVIEW, TEXAS 75069

FIG. 7

METHOD OF AND SYSTEM FOR IMPROVING SPRINKLER SYSTEM EFFICIENCY

CROSS-REFERENCE TO RELATED APPLICATIONS

This patent application claims priority from, and incorporates by reference the entire disclosure of, U.S. Patent Application No. 60/864,054, filed on Nov. 2, 2006.

BACKGROUND

1. Technical Field

The present invention relates to a method of water conservation. More specifically, the present invention pertains to a method of increasing the efficiency of residential and commercial irrigation systems.

2. History of Related Art

In an article titled "Global Water Shortage Looms in New Century," published in the Arizona Water Resource, Volume 8, Number 3, it is reported that 80 countries throughout the world are experiencing water shortages. It is also reported that 40% of the world's population does not have access to clean water. Not only does the available water supply appear to be diminishing, but the world's population is increasing. Various attempts to address this problem include desalinization and water conservation. In response to the increasing need to conserve water, some cities have already enacted ordinances that place restrictions on how and when irrigation can be performed. For instance, the Texas legislature has recently passed three bills placing mandates on municipalities with at least a population of 20,000 to adopt an ordinance that requires an installer of an irrigation system to hold a license and acquire a permit for the irrigation system. The municipalities are required to enforce rules set by Texas Commission of Environmental Quality (TCEQ) relating to irrigation.

Given the above, water conservation is of great interest. Reducing the amount of wasted water is one of the first steps to ameliorate this problem. Many devices and methods attempt to address the issue of water conservation. One area of particular focus pertains to automated irrigation systems. U.S. Pat. No. 7,058,478 ('478) discloses a device and method for water conservation and management. The '478 patent discloses simple parameters such as the time of year, local temperature, and geographic location to calculate and adjust an irrigation schedule on a daily or other periodic basis. The method of the '478 patent is centered around the idea that the amount of water required to irrigate landscaping or crops is based upon the temperature and time of year. More specifically, higher temperatures typically require the use of more water and lower temperatures typically require the use of less water. Furthermore, little or no water is typically required during the winter months. Also disclosed is an irrigation controller that allows a user to input the necessary information, namely the time of year, local temperature, and geographic location, from which the controller determines how much irrigation is needed.

Another device that addresses the issue of water management is disclosed in U.S. Pat. No. 6,234,403 ('403). The '403 patent discloses electro-mechanical means for determining the moisture content of the soil for manual watering and for controlling lawn sprinkler systems. The electro-mechanical means controls irrigation either by interacting with an irrigation system or indirectly by signaling a user that irrigation is necessary. The device determines soil moisture content through the use of probe that is placed into the ground. If the moisture content is too low, the irrigation system is automatically started or signals the user that irrigation is needed.

SUMMARY OF THE INVENTION

A method of increasing the efficiency of an automated irrigation system includes measuring an inline pressure of an irrigation system via an inline pressure gauge. The method also includes adjusting the inline pressure of the irrigation system to a value closer to a predefined optimal design pressure of a water outlet of the irrigation system and calculating a desired run time using at least the predefined optimal design pressure.

A system for improvement of irrigation efficiency includes a water source, an irrigation system, at least one inline pressure monitor, and at least one pressure reducer/regulator. The irrigation system includes at least one water outlet. The at least one inline pressure monitor is adapted to measure an inline water pressure of the irrigation system. The at least one pressure reducer is capable of adjusting the inline water pressure to a value close to or equal to a predefined optimal design value of the at least one water outlet.

A method of increasing the efficiency of an irrigation system includes measuring an inline pressure of an irrigation system via an inline pressure gauge. The method also includes adjusting, via at least one pressure reducer, the inline pressure of the irrigation system to a value closer to a predefined optimal design pressure of a water outlet of the irrigation system and calculating a desired run time using at least the predefined optimal design pressure.

A system for improvement of irrigation efficiency includes a water source, an irrigation system having at least one water outlet and at least two zones, at least one inline pressure monitor at each feeder of the at least two zones, and at least one pressure reducer installed at each valve of the at least two zones. The at least one inline pressure monitor is adapted to measure an inline water pressure of the irrigation system. The at least one pressure reducer is capable of adjusting the inline water pressure to a value close to or equal to a predefined optimal design value of the at least one water outlet.

BRIEF DESCRIPTION OF THE DRAWINGS

FIG. 1 is a spreadsheet providing an illustrative analysis of an irrigation system;

FIG. 2 is an illustrative table providing historical rainfall conditions for various Texas cities;

FIG. 3 is an illustrative table that lists turf crop factors for various types of grass;

FIG. 4 is an illustrative table providing the average historic potential evapotranspiration for various cities in Texas;

FIG. 5 is an illustrative table providing water savings multipliers for a given main line water pressure;

FIG. 6 is an illustrative table that lists the available water factor for various soils; and FIG. 7 is an example of a system analysis checklist used when analyzing an irrigation system.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Water outlets (e.g., pop up sprinklers, rotor sprinklers, impact rotor sprinklers, etc.) are generally designed to operate at a specific water flow rate and pressure. For example, a typical pop up sprinkler may be designed to operate at a flow rate of 4 gallons per minute (GPM) at a pressure of 30 pounds per square inch (PSI). When an irrigation system is fed water at a pressure higher than a predefined optimal design pressure, the sprinkler's flow characteristics deviate from those desired, which often results in an unnecessary excess amount of water being used along with improper coverage of the area to be irrigated and excessive run times to compensate for coverage issues resulting in run-off of excess wasted water.

Irrigation systems often access water via, for example, a recovered or desalinated water reservoir, by tapping into a main water line, or by pumping the water from a well. This main water line often distributes water at pressures in excess of the components' design pressure. Pressures over 100 PSI have been encountered. This undesirably high pressure typically creates the problem of using more water than is desired or necessary, resulting, for example, in fogging and runoff. Excess pressure has the added drawback of altering a spray pattern of the irrigation system. When the spray pattern is altered, certain areas may receive less water than desired, while others may receive more water than desired.

Thus, the efficiency and effectiveness of an irrigation system can be increased by ensuring that the water outlets of the irrigation system are operating closer to their predefined optimal design pressure. To attempt to supply the irrigation system with the optimal water pressure, water pressure currently being supplied to the irrigation system must first be determined. This may be accomplished by placing an inline pressure gauge between the main water line and the irrigation system. After the irrigation system pressure is determined, an appropriate change in pressure necessary to increase the efficiency of the irrigation system can be determined.

For example, if an irrigation system pressure of 40 PSI is measured, but the sprinkler heads of the irrigation system are designed to operate at 30 PSI, the excess pressure supplied to the irrigation system causes the water outlets to flow more water than they were designed to flow. This alters their spray pattern (and consequently, coverage area), delivers more water than required to the area being watered, and may decrease the longevity of irrigation system hardware. To reduce the pressure of the irrigation system to the predefined optimal design pressure, an inline pressure reducer may be used. Any inline pressure reducer may be used, such as an inline pressure regulator. Inline pressure regulators are commercially available from many irrigation system component manufacturers.

In one embodiment, it may be desirable to use one inline pressure reducer upstream from all the water outlets in the system so that the water outlet farthest from the main line is operating in an optimal pressure range. This will result in other upstream water outlets operating at pressures higher than their optimal pressures, but usually permits adequate watering of the area to be irrigated. The water outlet farthest from the water source is the outlet for which water will have the greatest length of irrigation pipe and most number of components to flow through to reach the water outlet, and thus will experience the greatest pressure drop and system resistance. Conversely, in some applications, it may be desirable to adjust the pressure so that the water outlet closest to the water source is operating at or near the predefined optimal design pressure. The water outlet closest to the water source is the water outlet for which water will have the least length of irrigation pipe and least number of components to reach the water outlet, and thus will experience the least pressure drop and system resistance. In another embodiment, the pressure is adjusted so that a water outlet other than the farthest water outlet and the closest water outlet operates at or near the predefined optimal design pressure. Yet, another embodiment includes an inline pressure reducer installed at each irrigation zone valve so that the inline pressure of each zone may be adjusted to a value close to or equal to the predefined optimal design pressure as desired. A fourth embodiment includes installation of a pressure reducer at each water outlet location in order to reduce the operating pressure to a value close to or equal to the predefined optimal design pressure at each water outlet. For purposes of the patent application, the term close to an amount means not more than 10% different from the amount.

After the irrigation system has been analyzed and the pressure has been reduced as desired, a recommended run time per zone can be determined. It should also be noted that the disclosed methods and systems can be utilized in conjunction with different types and scales of irrigation systems. For example, the disclosed methods and systems may be used with evapotranspiration systems, which are also know as ET systems. ET systems have become popular in recent years. ET systems attempt to calculate an appropriate run time for an irrigation system hydro-zone based on the calculated amount of water evaporation from the soil in addition to the calculated transpiration of the plant or turf type. Irrigation systems to which principles of the invention may be applied include residential, commercial, and agricultural applications. Such systems may be automated through the use of computers and timers or may be manually operated. These irrigation systems are merely examples, and should not be considered an exhaustive list of possible systems to which principles of the invention may be applied.

In addition to reducing the irrigation system pressure, other benchmark parameters can be adjusted to more efficiently irrigate the desired area. These parameters include the duration and frequency of operating the irrigation system, and can be managed manually or with an automatic controller.

Referring now to FIG. 1, an illustrative spreadsheet 1000 is shown that illustrates how to calculate a recommended run time per zone 322. The example shown in FIG. 1 assumes that the water outlets used are designed to flow 4 GPM at 30 PSI; however, the same method may be applied to other water outlets that are designed to operate at different flow rates and pressures. The spreadsheet 1000 includes several sections, each of which will be discussed in more detail below. Section 200 details various information about a customer whose irrigation system is being analyzed. Section 300 lists assumptions and on-site data for performing an analysis of the customer's desired irrigation area. The on-site data is previously captured in a System Analysis Checklist (see FIG. 7) for the respective property. Section 400 contains various measured existing irrigation system parameters of the customer's irrigation system. One or more of these parameters may be used in part to determine what changes are necessary to increase the efficiency of the irrigation system. Section 500 lists recommended changes to the irrigation system parameters to increase the efficiency of the irrigation system. Section 600 illustrates a reference table, as derived from the Bernoulli equation, detailing the water savings factor 620 for various irrigation system PSI 610. Section 700 lists various benchmark data necessary to complete the analysis of the customer's turf or plant type requirements. The benchmark data factors, as obtained from recognized institutions, can be modified/programmed to reflect local or regional factors regardless of domestic or international location. Section 800 summarizes the changes to the irrigation system and details the estimated monthly savings to the customer.

Still referring to FIG. 1, section 200 includes a date 210, a customer's name 212, and an address 214. The date 210, the customer's name 212, and the address 214 are included to identify which customer or client property the spreadsheet 1000 references.

FIG. 1 also includes section 300, which lists several basic parameters and assumptions made to analyze the irrigation system. In this example, head calculation factor 310 is a base factor used to identify flow calculations when a water outlet is being used to its full capacity measured in GPM. Water cost per 1000 gallons 314 is a price of water based on local market prices and may be used to determine how much money can be saved each month after the irrigation system has been modified. Number of zones 316 refers to the total number of watering zones the irrigation system is configured with. Typical irrigation systems do not water an entire area (e.g., a lawn) at the same time, but instead water one zone at a time of a total area to be irrigated. For example, a residence might have two separate zones that water a front lawn and a third zone that waters a back lawn. Additionally, an agricultural setup might have several zones to irrigate different fields or different portions of the same field. The number of zones is represented in 316. Each zone typically contains a number of water outlets, the total of which is represented by total heads in system 328. Number of weeks in water season 320 is based upon various factors, such as the local climate, monthly rainfall, plant type, and soil conditions.

Still referring to FIG. 1, recommended run time per zone 322 is typically determined by an equation provided by design criteria and is a function of the various parameters listed in Section 300, Section 400, Section 600, and Section 700. Calculation of the recommended runtime per zone 322 will be discussed in more detail below.

Still referring to FIG. 1, Section 300 also includes actual static pressure 324, which refers to the incoming water pressure from a main water line in PSI before it is fed to the irrigation system. Actual static pressure 324 is typically determined through measurement of the pressure with an inline pressure gauge. Irrigation system pressure 325 is the calculated water pressure in PSI that exists at the sprinkler heads and may also be determined by using an inline pressure meter. Due to frictional losses in the irrigation system piping and system components, irrigation system pressure 325 is lower than actual static pressure 324.

Section 300 of FIG. 1 also includes average estimated monthly household consumption 326, which is typically the average amount of water consumed each month excluding irrigation events. Average estimated monthly household consumption 326 may be determined by viewing past water bills of typical non watering months (December, January, February, and March) and averaging those billed calculations. Total heads in system 328 is the sum of all the sprinkler heads used in the irrigation system and is used to determine how much water the irrigation system distributes. Nozzle radius rating 330 is the radius in feet of the spray pattern of the sprinkler head and is a known property of sprinkler heads. Current rainfall 332 can be determined in a number of ways, including consulting U.S. Army Corps of Engineers reports, as shown in 714, and is typically measured in inches. Run time change 334 is the change of time in minutes that irrigation system run time should be adjusted to increase irrigation efficiency. Run time change 334 is determined by using Equation 2 below.

Run time change 334 may be calculated with either the current rain fall 714 or historical rainfall 712 data. Water requirement calculation 728 is substituted for local water requirement 730 of the same equation to derive the run time delta, which would then be added or subtracted depending on that calculated result. Run time change 334 is typically measured in minutes.

Referring still to FIG. 1, Section 400 details current water usage statistics for the irrigation system before any changes are made in an effort to increase the efficiency thereof. Irrigation system pressure 410 is the value of irrigation system pressure 325 from Section 300. Water savings factor 412 may be selected from a reference table shown in Section 600 for a corresponding irrigation system pressure 410. See also FIG. 5. The water savings factor 412, is typically utilized to determine the amount of water that is wasted by operating the sprinkler head at a pressure higher than a design component operational pressure. In the example shown in FIG. 1, water savings factor 412 is shown to be 0.16. The water saving factor 412 is derived using the Bernoulli equation below:

$$P + \tfrac{1}{2}\rho V^2 + \rho g h = \text{constant}$$

where P is pressure, p is density, V is velocity, h is elevation, and g is the gravitational acceleration. According to exemplary embodiments, pressure is a scalar and has SI units of Pascal (Pa) where 1 Pa=1 N/m$^2$, density ($\rho$) is measured in kg·m$^{-3}$, velocity (V) is measured in meters per second (m/s), gravitational acceleration (g) is 9.80665 m/s$^2$ or 32.174 ft/s$^2$, and elevation (h) is measured in meters. The units as described above are exemplary and other units may be used.

Still referring to FIG. 1, total system heads 414 is the total number of sprinkler heads in the irrigation system. Water days per month 416 is the number of days per month the irrigation system is operated under non-drought conditions, or is allowed to be operated under drought restrictions prior to any changes made to the system to increase its efficiency. Water days per week 418 may be determined in a similar fashion. Program starts per cycle 420 is the number of periods of operation the irrigation system is used per irrigation cycle. For example, if the recommended run time per zone were 20 minutes, it might be desirable to irrigate the area in four periods of five minutes each. Dividing the run time into separate periods may be beneficial, as some soils become saturated more quickly than others; when the saturation point is reached, runoff often occurs. Dividing the runtime into several blocks serves to avoid the problem of saturation and eliminates the problem of runoff.

Still referring to FIG. 1, total time per cycle 422 is the amount of time in minutes the irrigation system was activated before any changes are made to the irrigation system. Total run time per week 424 is a measure of how many minutes per week the irrigation system is used and is typically determined by the product of water days per week 418 and run time per cycle 422. Excess water per head 426 is a measure of how many extra GPM are used per sprinkler head prior to making changes to increase the efficiency of the irrigation system. To determine excess water per head 426, the designed flow value of 4 GPM is multiplied by water savings factor 412. The result for the example shown in FIG. 1 is that 0.16 GPM are wasted per sprinkler head when operating the irrigation system at a pressure of 40 PSI instead of the design pressure of 30 PSI. The irrigation system shown in FIG. 1 contains 50 sprinkler heads, which means that 32 GPM are wasted during operation of the irrigation system. This value is represented by excess system water 428, and is typically measured in gallons.

Section 400 of FIG. 1 also includes total regional watering season run time per month 430, which is a measure of how many minutes per month the irrigation system is used. Excess water usage per month 432 is a function of excess system water 428 and total run time per month 430. Excess water cost per month 434 is a function of the excess water usage per month 432 and water cost per 1000 gallons 312. Total season run time 436 is a measure of how many minutes the irrigation system is used for one watering season before any changes are made to the irrigation system. Excess water per season 438 is a comparison of the water used by the irrigation system before changes are made to increase the efficiency of the system and after the changes have been made. Excess water cost per season 440 is a function of excess water per season 438 and water cost per 1000 gallons 312.

Still referring to FIG. 1, section 500 lists recommended changes to the irrigation system for both documented historical rainfall conditions and the current rainfall conditions for the area. Historical rainfall conditions are provided as a reference. FIG. 2 is a table illustrating historical rainfall conditions for various Texas cities. To obtain more accurate results, changes to the system should be based upon current rainfall conditions. More specifically, section 500 specifies recommended changes to the parameters of Section 400 to reduce the amount of wasted water.

Still referring to FIG. 1, irrigation system pressure 510 should typically be adjusted to a value close to or equal to the predefined optimal design pressure of the water outlets installed in the irrigation system by using the appropriate inline pressure regulator. In the example illustrated by FIG. 1, that pressure is 30 PSI. Water savings factor 512 in section 500 is zero because the sprinkler is operating at the optimal pressure of 30 PSI; thus, no water savings is expected. Total system heads 514 remains unchanged and is the same as in Section 300. Water days per month 516, water days per week 518, program starts per cycle 520, total time per cycle 522, and total run time per week 524 are determined based upon recommended run time per zone 322 and will be discussed in more detail below. Water per head 526 is the amount of water in GPM that each sprinkler head flows. Water per head 526 should now be close to or equal to the specified flow rate as the irrigation system pressure 510 has been adjusted to a value close to or equal to the predefined optimal design pressure.

Still referring to FIG. 1, amount of system water 528 is the amount of water in gallons used per watering session. Total run time per month 530 is a measure of how many minutes a month the irrigation system is used and is a function of the recommended run time per zone 322. Total run-time per month 530 will be discussed in more detail below. Water usage per month 532 is a function of the amount of system water 528 and the total run time per month 530. Water cost per month 534 is a function of water usage a month 532 and cost per 1000 gallons 314. Total season run time 536 is a measure of how many minutes the irrigation system is used for one watering season. Water per season 538 is a measure in gallons of the water used for the whole watering season, and is a function of water usage per head 526, total system heads 514, and total season run time 536. Water cost per season 540 is a function of water per season 538 and cost per 1000 gallons 314.

Referring still to FIG. 1, Section 600 contains a table listing water savings factor 620 at corresponding irrigation system PSI 610. Section 700 details various benchmark data necessary in the determination of the proper irrigation system configuration. Water requirement 710 is a measure in inches per month of the amount of water required by the area to be irrigated. Water requirement 710 is referenced from a table as obtained from recognized institutions.

FIG. 4 is an illustrative table listing the amount of water in inches historically required for each month for various cities throughout Texas. Historical rainfall 712 is an average rainfall based upon past rainfall in the area. Historical rainfall 712 is used in determining recommended run time per zone 322 and is discussed in more detail below. Local rainfall 714 is a measure of how much rain has fallen in the area during the current watering season. Turf coefficient 716 is a function of the plant to be irrigated and is referenced from a table like the one shown in FIG. 3 provided in this instance by Texas A&M University. Precipitation rate 718 is the rate of water in inches per hour provided by one sprinkler head, and is a known property of the sprinkler head based on nozzle radius rating 330. Root depth 720 is a measure in inches of the root structure of the plant to be irrigated. Available water 722 is a property of the surrounding soil, and is referenced from a table like the one shown in FIG. 6 provided in this instance by Texas A&M University.

Allowable depletion 724 is a correction factor utilized to allow the plant to be irrigated less frequently, but frequently enough to ensure adequate irrigation. Typical values for allowable depletion factor 724 are around 0.5. Water days calculation 726 is the calculated number shown in 416 and 516. Water days calculation 726 is related to recommended run time per zone 322 and will be discussed further below. Water requirement calculation 728 is the amount of water that the irrigation system must provide for the month based on historical averages after current rainfall 332 and available water 722 have been taken into account. Local water requirement 730 is the actual amount of water the irrigation system must provide based upon recent rain conditions of the surrounding area.

Still referring to FIG. 1, Section 800 details both normal and current rainfall conditions. Current estimated monthly irrigation consumption statistic 810 is the estimated amount of water in gallons used each month. Normal rainfall conditions 812 details the estimated water usage statistics based on historical averages of rainfall. The water usage statistics included are estimated monthly irrigation consumption 814, estimated consumption reduction per month 816, and estimated cost savings per month 818. Current rainfall conditions 820 details the estimated water usage statistics based on the actual, recent rainfall conditions. Included in current rainfall conditions 820 are estimated monthly irrigation consumption 822, estimated consumption reduction per month 824, and estimated cost savings per month 826.

Calculation of recommended run time per zone 322 will now be discussed in greater detail. Recommended run time per zone 322 is dependent upon several elements. In a typical embodiment, these elements include water requirement 710, precipitation rate 718, turf coefficient 716, root depth 720, available water 722, and local rain fall 714.

To calculate recommended run time per zone 322, water requirement per month is first calculated using Equation 1 below:

$$R = (W_r T_c) - R_m \qquad (1)$$

where R is the water requirement per month measured in inches, $W_r$ is water requirement 710, $T_c$ is turf coefficient 716, and $R_m$ is local rainfall 714. After R has been calculated, the run time per month is calculated using Equation 2 below:

$$R_t = \frac{R}{P_r}(60) \qquad (2)$$

where $R_t$ is the run time per month measured in minutes, R is the water requirement per month calculated from Equation 1 above, Pr is precipitation rate 718, and 60 is A conversion factor used to obtain the run time per month in minutes.

The next step in determining the recommended run time per zone 322 is to calculate the allowable depletion 724. The allowable depletion is calculated using Equation 3 below:

$$A_D = R_d W_a A_{df} \quad (3)$$

where $A_D$ is the allowable depletion in inches, $R_d$ is root depth 720, $W_a$ is water available 722, and $A_{df}$ is allowable depletion factor 724. The total number of watering days per month is calculated next using the following equation:

$$D = \frac{R}{A_D} \quad (4)$$

where D is the total number of watering days per month 516, R is the water requirement per month calculated from Equation 1 above, and $A_D$ is the allowable depletion calculated from Equation 3 above. Recommended run time per zone 322 can now be calculated by dividing $R_t$ by D.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A spray irrigation system comprising:
   a plurality of zones, each of the plurality of zones comprising:
      a spray water outlet operating at a water pressure; and
      a water-pressure reducer interoperably coupled to the spray water outlet;
   wherein, for each zone of the plurality of zones, the water pressure is determined via a zone-feeder inline water-pressure monitor;
   wherein, for each zone of the plurality of zones, the water-pressure reducer causes the water pressure to be closer to an optimal operating pressure for the spray water outlet than if the water-pressure reducer were not present; and
   wherein, for each zone of the plurality of zones, an amount of water-pressure adjustment provided by the water-pressure reducer is based, at least in part, on a difference between a water pressure measured by the zone-feeder inline water-pressure monitor and the optimal operating pressure.

2. The system of claim 1, further comprising a water source, wherein the water source comprises at least one of a water main, an irrigation pumping well, a recovered water reservoir, and a desalinated water reservoir.

3. The system of claim 1, wherein the water-pressure reducer comprises a pressure reducer located down-line from a zone feeder of each the plurality of zones.

4. The system of claim 1, wherein the spray irrigation system comprises at least one of an evapotranspiration system, an agricultural irrigation system, a residential irrigation system, or a commercial irrigation system.

5. The system of claim 1, wherein the spray irrigation system comprises an automated timer.

6. The system of claim 1, wherein the spray irrigation system comprises an automated controller.

7. A method of increasing an efficiency of a spray irrigation system, the method comprising:
   measuring an operating water pressure of a spray irrigation system via a water-pressure gauge;
   adjusting, via at least one pressure reducer, the operating water pressure to a value closer to a predefined optimal operating pressure of a water outlet of the spray irrigation system; and
   calculating a desired run time using the predefined optimal operating pressure, and at least one of a turf coefficient, a local rainfall, and a precipitation rate.

8. The method of claim 7, wherein the step of measuring comprises using the water-pressure gauge at a location at or near a water source.

9. The method of claim 8, wherein the step of adjusting comprises using the at least one pressure reducer to adjust the operating water pressure of a water outlet closest to the water source.

10. The method of claim 8, wherein the step of adjusting comprises using the at least one pressure reducer to adjust the operating water pressure of a water outlet farthest from the water source.

11. The method of claim 8, wherein the step of adjusting comprises using the at least one pressure reducer to adjust the operating water pressure of a water outlet located between a water outlet closest to the water source and a water outlet farthest from the water source.

12. The method of claim 7, wherein the step of measuring comprises using the water-pressure gauge at a location at or near a zone feeder of each of a plurality of zones of the spray irrigation system.

13. The method of claim 12, wherein the step of adjusting comprises using the at least one pressure reducer to adjust the operating water pressure of a water outlet closest to the zone feeder.

14. The method of claim 12, wherein the step of adjusting comprises using the at least one pressure reducer to adjust the operating water pressure of a water outlet farthest from the zone feeder.

15. The method of claim 12, wherein the step of adjusting comprises using the at least one pressure reducer to adjust the operating water pressure of a water outlet located between a water outlet closest to the zone feeder and a water outlet farthest from the zone feeder.

16. The method of claim 7, wherein the step of measuring comprises using the water-pressure gauge at each water outlet in the spray irrigation system.

17. The method of claim 16, wherein the step of adjusting comprises using the at least one pressure reducer to reduce the operating water pressure at each water outlet in the spray irrigation system.

18. The method of claim 7, wherein the step of adjusting results in an increase in the operating water pressure.

19. A system for improvement of irrigation efficiency, the system comprising:
   a spray irrigation system comprising a water outlet and at least two zones;
   a pressure monitor disposed at a feeder of each zone of the at least two zones, the pressure monitor adapted to measure water pressure;
   a pressure reducer installed at a valve of each zone of the at least two zones, the pressure reducer adapted to adjust water pressure to an operating-water-pressure value close to or equal to a predefined optimal operating pressure of the water outlet; and
   wherein, for each zone, an amount of water-pressure adjustment provided by the pressure reducer is based, at least in part, on a difference between a water pressure measured by the pressure monitor and the predefined optimal operating pressure.

* * * * *